United States Patent [19]

Ruhoff et al.

[11] Patent Number: 4,914,139

[45] Date of Patent: Apr. 3, 1990

[54] MODIFIED ALKYD CATIONIC ELECTRODEPOSITION COMPOSITIONS FOR PRODUCING CHIP-RESISTANT FILMS

[75] Inventors: Philip J. Ruhoff, Minneapolis; Rodney W. Stockstad, Plymouth; James A. Prevost, Bloomington; Larry B. Brandenburger, Lino Lakes, all of Minn.; Robert B. Edenborg, Beaver Dam, Wis.

[73] Assignee: The Valspar Corporation, Minneapolis, Minn.

[21] Appl. No.: 234,471

[22] Filed: Aug. 19, 1988

[51] Int. Cl.[4] .............................................. C08L 67/08

[52] U.S. Cl. .................................... 523/500; 528/272; 528/288; 528/295.5; 528/303; 528/306; 525/7; 525/238; 525/451; 525/530; 428/462; 428/463

[58] Field of Search ..................... 528/272, 288, 295.5, 528/303, 306; 525/7, 238, 451, 530; 428/462, 463; 523/500

[56] References Cited

U.S. PATENT DOCUMENTS

| | | | |
|---|---|---|---|
| 4,511,692 | 4/1985 | Anderson et al. | 525/7 |
| 4,547,556 | 10/1985 | Hughes et al. | 526/75 |
| 4,804,581 | 2/1989 | Geary et al. | 428/332 |

*Primary Examiner*—John Kight

*Assistant Examiner*—Sam A. Acquah

*Attorney, Agent, or Firm*—James R. Haller; Gregory P. Kaihoi; Mary P. Bauman

[57] ABSTRACT

An alkyd-type electrodepositable coating composition derived from the reaction of a base alkyd with ethylenically unsaturated monomers including an amine-functional monomer is provided with improved resistance to chipping by chemically incorporating in it by covalent bonding one or more chemical agents selected from the group of:

(a) preformed elastomers having functional groups reactive with carboxyl or hydroxyl groups of acid and polyol alkyl precursors, and (b) an addition polymerizable monomer having primary and secondary ethylenic unsaturation.

14 Claims, 1 Drawing Sheet

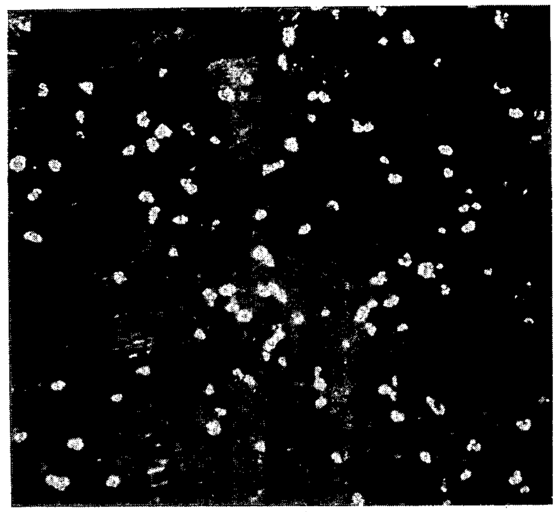
Fig. 1
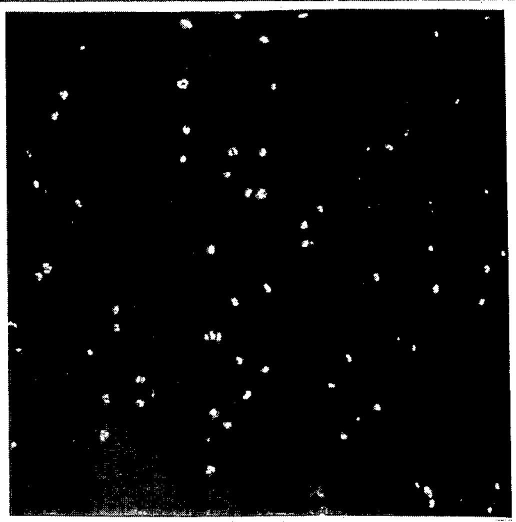
Fig. 2
Fig. 3

MODIFIED ALKYD CATIONIC ELECTRODEPOSITION COMPOSITIONS FOR PRODUCING CHIP-RESISTANT FILMS

BACKGROUND OF THE INVENTION

Coating positions that are applied by electrical deposition procedures are known in the field and are described, for example, in U.S. Pat. No. 4,547,556 (Hughes, et al.) and U.S. Pat. No. 4,511,692 (Anderson, et al.). The electrodeposition compositions described in the last-mentioned patent provide excellent protective films that can be adequately cured at temperatures of 100°-175° C. or less. Such cured films commonly are used as protective paint coatings for farm implements and for other products that are exposed to environments in which the coatings may be impacted by sand, sharp rocks or the like that tend to chip the coatings. Although the coatings described in the last-mentioned patent are excellent from the standpoint of chemical resistance and protection of underlying substrates, it is desired to improve the chip resistance of such coatings without significantly changing the electrodeposition or heat cure requirements.

BRIEF SUMMARY OF THE INVENTION

The present invention provides an alkyd-type, chip-resistant cationic electrodeposition coating composition that is curable at relatively low temperatures and which forms a film that is highly resistant to chipping from flying stones and the like. The composition includes a modified alkyd comprising the reaction product of (1) a base alkyd derived from the reaction of a polyol with at least one unsaturated fatty acid, and (2) ethylenically unsaturated monomers including an amine functional unsaturated monomer in a quantity sufficient to render the coating composition water-dispersible and cationically electrodepositable.

The modified alkyd composition of the coating composition has chemically incorporated in it by covalent bonding one or more chemical agents which increase the resistance to chipping of coatings made from the composition. The modified alkyd composition may include one or more such agents, the latter being present in sufficient quantities as to significantly improve resistance to chipping.

One such agent comprises an elastomer having one or more functional groups that are reacted with carboxyl or hydroxyl groups of the acid or polyol during alkyd formation, the functional groups desirably being hydroxyl, carboxyl or amine groups. The elastomer is desirably derived from the polymerization or copolymerization of butadiene.

Another such agent comprises an addition polymerizable monomer having both primary ethylenic unsaturation (e.g.,

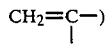

and secondary ethylenic unsaturation (e.g.,

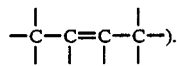

This monomer is included in the ethylenically unsaturated monomers (including an amine-functional monomer) that are reacted in the presence of the base alkyd to impart to the ultimate coating significant resistance to chipping.

To the thus-modified base alkyd may be added other materials which improve resistance to chipping, and ethylenically unsaturated, addition polymerizable monomers and oligomers are preferred.

DESCRIPTION OF THE DRAWING

FIGS. 1-3 are photographic representations of sections of steel panels that were coated with the coating compositions of Examples X-XII, respectively, and subjected to a chipping test.

DESCRIPTION OF THE PREFERRED EMBODIMENTS

Base alkyds that are useful in the manufacture of coating compositions are well known, and reference is made particularly to U.S. Pat. No. 4,511,692, the teachings of which are incorporated herein by reference, for a discussion of such compositions. Base alkyds in general are derived from the reaction of polyols with polybasic acids, diacids and monoacids, including fatty acids. The fatty acids which are employed provide base alkyds with a measure of unsaturation enabling them to undergo copolymerization with ethylenic unsaturated monomers and to ensure satisfactory oxidative cure. As taught in U.S. Pat. No. 4,511,692, one or more ethylenically unsaturated monomers such as acrylates and vinyls, at least one of the monomers having sufficient amine functionality as to render the coating composition dispersible in water and cationically electrodepositable are reacted in the presence of the base alkyd. In addition to addition polymerization of the monomers, at lease some chemical bonding, via grafting, occurs between the base alkyd and the ethylenically unsaturated monomers. Amine functional acrylates and methacrylates are particularly preferred for this purpose. As used herein, "(meth)acrylate" refers both to methacrylates and acrylates.

In the manufacture of the base alkyd, fatty acids having some unsaturation (exhibiting an iodine value of at least about 25), may be combined with one or more polyhydric alcohols, one or more polybasic acids, a grafting agent and, optionally, a non-fatty monoacid in a reaction vessel under an inert atmosphere. Other monoacids can be included as is known in the art, and the presently preferred non-fatty monoacid is benzoic acid.

Polyhydric alcohols useful in preparation of the base alkyd include those having at least two carbon atoms per molecule and also having two to six hydroxyl groups per molecule. Examples include glycerin, pentaerythritol, trimethylolpropane, trimethylpentane diol, cyclohexane dimethylol, trimethylolethane, dipentaerythritol, ethylene glycol, propylene glycol, 1,3-butylene glycol, neopentyl glycol, hydrogenated bisphenol A, 2,2-dimethyl-3-hydroxypropyl-2,2-dimethyl-3-hydroxy propionate, dimethylolpropionic acid and the like. Preferred polyhydric alcohols include pentaerythritol, trimethylolpropane, cyclohexane dimethylol and trimethylolethane.

Preferred fatty monobacic acids which have a high linoleic acid content include high purity tall oil fatty acids and soy bean fatty acids.

Grafting agents, as referred to above, include fatty acids such as conjugated tall oil (e.g., the conjugated fatty acid sold under the trademark PAMOLYN 380 by Hercules, Inc.), the latter composition having a high concentration of unsaturation at positions 9 and 11 of a $C_{18}$ fatty acid. Other desired grafting agents include monoacids such as crotonic acid and sorbic acid, ethylenically unsaturated diacids such as maleic, itaconic and tetrahydrophthalic acids and anhydrides, and ethylenically unsaturated isocyanates such as isocyanatoethyl methacrylate.

Suitable polybasic acids include saturated and aromatically unsaturated acids and anhydrides having at least two carboxyl groups per molecule. Examples include malonic, glutaric, pimelic, suberic, azelaic, sebacic, succinic, adipic, phthalic, isophthalic, terephthalic, and hexahydrophthalic acids, trimellitic anhydride, 3,3,4,4-benzophenone tetracarboxylic acid dianhydride and dimerized fatty acids. Desirably, from about 5% to about 60% by weight of base alkyds of the invention are derived from polybasic acids, from about 5% to about 60% is derived from polyhydric alcohols, from about 10% to about 90% is derived from monobacic fatty acids, from 0.5% to about 60% is derived from grafting agents, and, optionally, from about 0% to about 50% is derived from non-fatty monoacids. The base alkyd manufacturing process commonly involves blending together the ingredients referred to above and reacting the same at a temperature up to about 460° F. to an acid value of approximately 10, following which the reaction mixture is cooled and an appropriate solvent is added to control viscosity. The following Table I lists preferred and most preferred ingredients for a typical base alkyd, reference being made to U.S. Pat. No. 4,511,692:

TABLE I

| Ingredient | Percent by Weight of Base Alkyd | |
|---|---|---|
| | Preferred | Most Preferred |
| Polybasic Acid | 5 to 60 | 15 to 30 |
| Polyhydric Alcohol | 5 to 60 | 15 to 30 |
| Fatty Acid | 10 to 90 | 40 to 75 |
| Grafting Agent | 0.5 to 60 | 2 to 10 |
| Non-fatty Monobasic Acid | 0 to 50 | 5 to 35 |

Once the base alkyd has been formed, it may be reacted with one or more ethylenically unsaturated monomers to form a modified alkyd composition, the monomers including at least one amine-functional unsaturated monomer in sufficient quantity to render the coating composition water dispersible and cationically electrodepositable. Amine-functional ethylenically unsaturated monomers include dimethylaminoethyl methacrylate and acrylate, tertiary butylaminoethyl methacrylate and dimethylaminopropyl mehhacrylamide. Non-amine functional monomers include acrylates such as methyl methacrylate, butyl methacrylate, butyl acrylate, lauryl methacrylate and the like. Styrene may be used as an ethylenically unsaturated monomer. The weight ratio of ethylenically unsaturated monomers to base alkyd may range from about 9/1 to 1/9 and preferably from about 8/2 to 3/7. The addition polymerization reaction involving the unsaturated functionality of the base alkyd and ethylenically unsaturated monomers such as those described above proceeds preferably via free-radical initiation utilizing such initiators as 2,2-azobisisobutyronitrile and dicumyl peroxide. The following Table II lists preferred and most preferred ethylenically unsaturated monomer ingredients in a typical blend of ethylenically unsaturated monomers to be reacted with a base alkyd to form a modified alkyd:

TABLE II

| Monomer | Percent by Weight of Monomers | |
|---|---|---|
| | Preferred | Most Preferred |
| Acrylic or Methacrylic | 0 to 95 | 10 to 80 |
| Vinyl (e.g., styrene) | 0 to 95 | 10 to 80 |
| Amine Functional | 5 to 95 | 5 to 45 |

In accordance with the invention, one or more chemical agents may be incorporated chemically into the modified alkyd composition to improve the resistance to chipping of coatings prepared from the alkyd. Without being bound to any particular theory, it is believed that some of these agents, particularly those which may be elastomers, tend to inhibit crack propagation in the coating, rendering chipping largely a surface phenomenon and preventing cracks from extending through the coating.

One such agent, which may be included with the amine-functional and other unsaturated monomers referred to above for reaction with the base alkyd, is a monomer having a molecular weight of at least 200 and having at least two different ethylenically unsaturated groups. One of the unsaturated groups, commonly a $$CH_2{=}\underset{|}{C}R$$

group in which R is hydrogen or methyl, is capable of participating in a free radical-initiated addition polymerization reaction. Groups of this type may be derived from (meth)acrylyl groups (as from, for example, glycidyl methacrylate) or from allyl groups, (as from, for example, allyl alcohol). For brevity, these active unsaturated groups may be termed "primary." To avoid gellation, primary groups are present in a concentration not exceeding about one group per molecule. The other ethylenically unsaturated group, commonly a

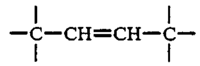

group, is substantially less reactive but is capable of cross-linking with similar groups upon oxidative air curing. Groups of the latter type (referred to herein as "secondary" groups) desirably are provided by such acids as sorbic and crotonic acids and by unsaturated fatty acids. Fatty acids are typically in the molecular weight range of about 150-350 and preferably in the range of about 250-300, and are derived from tall oil, linseed oil, soybean oil, and the like. Linoleic fatty acids derived from vegetable oil have given good results. Typically, fatty acids have an average of 1-3 unsaturated groups per molecule; commercially available fatty acids commonly include some saturated fatty acids such as stearic acid.

Monomers containing both primary and secondary ethylenically unsaturated groups desirably are derived from the reaction of a first compound having a primary unsaturated group with a second compound having a secondary unsaturated group. The first mentioned compounds may include functional (meth)acrylates such as glycidyl methacrylate and hydroxy alkyl (meth)acrylates and allyl alcohol and its derivatives such as allyl glycidyl ether. The second mentioned compounds include unsaturated acids such as crotonic, itaconic and sorbic acids and their derivatives and unsaturated fatty acids and their derivatives. Monomers derived from the reaction of glycidyl methacrylate with an unsaturated fatty acid have been used to provide coatings exhibiting excellent resistance to chipping.

Monomers with primary and secondary ethylenic unsaturation desirably are used in concentrations of up to about 50% by weight of the base alkyd, preferably in the range of from about 10% to about 30% by weight of the base alkyd, enough of the monomer being used to provide significant improvement in chip resistance. The primary and secondary unsaturated monomers may be used either with or without the use of the elastomers referred to below.

Another chemical agent that can be chemically incorporated in the base alkyd to improve chip resistance is a preferably pre-formed elastomer having functional groups reactive with hydroxyl or carboxyl groups of the base alkyd, the elastomer being employed in sufficient quantity so as to significantly increase chip resistance. The functional groups of the pre-formed elastomers preferably are carboxyl groups, hydroxyl groups, or amine groups, and the average functionality of the elastomers generally ranges from about 1.8 to about 2.2 groups per molecule. The elastomers that are employed desirably are generally linear, and the functional groups referred to above preferably are terminal groups. Polybutadiene and polybutadiene/acrylonitrile copolymers are preferred, and may have molecular weights generally in the range of from about 1000 to about 100,000; molecular weights in the range of 3,000-5,000 have given good results. Various polymers of butadiene, isoprene, isobutylene and the like having approximately two functional groups per molecule (e.g., in the range of about 1.8 to about 2.2 groups per molecule) are contemplated for use in the present invention. Polybutadiene and polybutadiene/acrylonitrile copolymers having approximately two carboxyl groups per molecule are preferred. One such polymer, sold as CTBN 1300X31 by B.F. Goodrich, is a carboxyl-terminated polymer derived from approximately 90% butadiene and about 10% acrylonitrile, the functionality of the polymer being approximately 1.9 and the number average molecular weight being approximately 3800.

The pre-formed elastomers with functional groups, when used in the instant invention, preferably are added and reacted with existing hydroxyl or carboxyl groups of the other base alkyd reaction ingredients during preparation of the base alkyd and before reaction of the base alkyd with unsaturated, amine-functional monomers. The pre-formed elastomers, when employed in the instant invention, are used in amounts providing significant chip resistance to the final coating and can be employed with or without other chip-resistant additives that improve chip resistance. The elastomers desirably are used in amounts ranging from about 5% to about 70% by weight of the base alkyd, more preferably in the range of from about 7% to about 20% by weight of the base alkyd, with excellent results having been obtained at a concentration of about 10% based on the weight of the base alkyd.

As will now be understood, the functional elastomers referred to above and the compounds having both primary and secondary ethylenically unsaturated groups are chemically incorporated via covalent bonding and form an integral part of the modified alkyd composition used in the coating composition of the invention.

If desired, the chip-resistant alkyd coating compositions of the invention may include additives which provide the compositions with further resistance to chipping. Such additives include ethylenically unsaturated, addition-polymerizable (under free radical initiation) monomers or oligomers in sufficient quantity to improve chip resistance of the resulting product. The monomers and oligomers, which preferably have substantially linear backbones and molecular weights of at least about 150, may be reactive with the fatty acid unsaturation of the base alkyd and desirably are soluble in an aromatic organic solvent such as toluene or aliphatic solvents such as alcohols, glycol ethers and ketones. The substantially linear backbone desirably is largely or predominantly polymethylene, and the monomers and oligomers contain an average of from about 1.2 to about 4 (and preferably about 1.5 to about 2.5) ethylenically unsaturated groups per molecule. The monomers and oligomers may include various other functional groups. A preferred class of monomers and oligomers are compounds of the formula $$R-(CH_2)_x-R'$$

in which R is an ethylenically unsaturated group such as vinyl, acrylyl or methacrylyl and R is the same as R or is a hydroxyl, amino, carboxyl, glycidyl, or isocyanate functional group or is H or methyl. Long chained diol di(meth)acrylates are particularly preferred, particularly those diol di(meth)acrylates having from about 4 to about 20 carbon atoms, preferably predominantly in the form of methylene groups, between the acrylyl end groups. The $C_{14}$ diol diacrylate known as C-2000 and sold commercially by Sartomer Company has given particularly good results.

Another preferred class of monomers and oligomers which may be added to the modified alkyd resin composition comprises the reaction products of a polyisocyanate with (meth)acrylic acid or a (meth)acrylate. Particularly preferred is the reaction product of the caprolactone adduct of hydroxyethyl acrylate (e.g., Tone M 100, Union Carbide) with a biuret of 1,6-hexamethylene diisocyanate (e.g., Desmodur L-2291, Mobay Corp.). This specific product, having a substantially linear backbone (including linear segments having acrylyl terminal groups) has given good results. Preferred are the reaction products of polyfunctional isocyanates (having two or more isocyanate groups per molecule) with hydroxyalkyl (meth)acrylates, the alkyl portion of which includes from about 2 to about 50, desirably from about 2 to about 14, carbon atoms.

One or two or more monomeric and oligomeric materials of the type described may be employed in the present invention; if used, such materials are present in a quantity sufficient to significantly improve the chip resistance of the resulting coating material. Added monomers and oligomers in amounts ranging from about 3% to about 50% of the modified alkyd are desired, the preferred range being from about 3% to about 25% and the most preferred range being from about 10% to about 25%.

Resistance to chipping is an outstanding feature of coating compositions of the present invention. To test the chip resistance of coatings, a test device similar to that shown and described in ASTM Test D-3170-74 is employed. The test device comprises a box-like enclosure with a closable top to prevent the escape of gravel from the container. Near one end, the container is provided with a mounting bracket for holding coated test panels. Near the other end of the container is mounted a section of standard 2-inch pipe, the pipe being horizontally positioned and aimed perpendicular to and at the approximate center of the coated surface of a mounted test target. A "T" coupling is provided at the rearward end of the pipe section with the leg of the "T" oriented upwardly to support a funnel through which gravel can be poured into the "T" connection itself. A compressed air line is attached to the remaining open end of the "T" connector in such a fashion that as gravel drops from the funnel into the "T" section, compressed air blowing through the "T" section entrains the gravel and impels it against the test panel. Water-eroded alluvial road gravel passing through a $\frac{5}{8}$-inch space screen but retained on a $\frac{3}{8}$-inch space screen is employed. The air pressure to the "T" coupling is maintained at approximately 90 psi.

Testing is performed at room temperature. For each test, two pints of gravel are employed. The gravel is manually but fairly uniformly poured into the funnel over a 20-second period, air under pressure being forced through the "T" connector to impel the stones through the pipe and against the test panel positioned $13\frac{3}{4}$ inches away from the end of the pipe from which stones are impelled.

After each test, the test panel is removed and graded as to the severity of chipping on a scale of from 0 to 9. Grading is accomplished by visually comparing the tested panels with a series of ten photographs of panels showing varying degrees of chip damage. The least chip damage is designated "9" and the most chip damage is graded "0", there being visually perceptible differences between the amount of chip damage in succeedingly numbered photographs. Chipping damage of the panels graded "0" was depicted in the photographs as being extensive, the recesses resulting from different stone impacts tending to merge into one another and extending completely through the coating to expose the metal panel. It has been visually estimated that about 40% of the panel surfaces graded "0" were laid bare to the metal. Panels graded "9" showed barely visible chip damage, none of the chips being sufficiently deep as to expose the metal substrate of the panel. The differences in chip resistance between any two grade numbers in sequence was significant, and chip resistance differences between panels differing by two or more grade numbers were deemed to be substantial.

The invention may be more readily understood by reference to the following, non-limiting examples, wherein parts are expressed as parts by weight:

EXAMPLE I

This example shows the preparation of a base alkyd resin. To a reaction vessel equipped with thermometer, stirrer, reflux condensor, nitrogen inlet and Dean Stark water separator was added 254 parts of Hercules, Inc.'s Pamolyn 380 brand fatty acid (having a high concentration of unsaturation at positions 9 and 11 of a C-18 fatty acid), 1137 parts of Emersol 315 brand fatty acid (Emery Chemicals), 885 parts of benzoic acid, 746 parts of isophthalic acid and 850 parts of pentaerythritol. The mixture was heated to about 250° F., following which there was added to the mixture 3.8 parts of Fascat 4201 brand catalyst (dibutyltin oxides, M & T Chemicals, Inc.). The mixture was heated, and xylene (80 parts by weight) was added to permit removal of water as an azeotrope, the temperature increasing to 460° F. The reaction was continued until an acid value of about 5 to 7 and a viscosity of about X to Y on the Gardner scale was obtained with a sample cut to about 70% solids with xylene. The resin was then cooled, and 794 parts of the propyl ether of propylene glycol (Propyl Propasol, Union Carbide Corp.) was added when the temperature dropped below about 300° F.

EXAMPLE II

This example shows the preparation of a base alkyd using, as a reactant, an elastomer reactive with hydroxyl or carboxyl groups of the base alkyd to impart chip resistance to the final coating. In this example, the elastomer is a carboxyl-terminated butadiene/acrylonitrile copolymer sold as CTBN 1300 X31 by B.F. Goodrich.

To a reaction vessel equipped with thermometer, stirrer, reflux condensor, nitrogen inlet and Dean Stark water separator was added 149.7 parts of Pamolyn 380 brand fatty acid, 670.3 parts of Emersol 315 brand fatty acid, 413.6 parts of benzoic acid, 376.5 parts of isophthalic acid, 439 parts of pentaerythritol and 200 parts of CTNB 1300 X31. The mixture was heated to about 250° F., following which 2.0 parts by weight of Fascat 4201 catalyst was added and further heat was applied to the reaction vessel. 60 parts of xylene were added at a rate permitting the azeotropic removal of water, the temperature increasing to about 460° F. The reaction continued until an acid value of from about 5 to about 7 and a viscosity of about X to about Y on the Gardner scale was obtained on a sample of the mixture cut to about 70% solids with xylene. The reaction mixture was cooled, and 620 parts of the propyl ether of propylene glycol was added when the temperature fell below about 300° F.

EXAMPLE III

This example illustrates the preparation of a "grind" vehicle of the type used in paints, utilizing an alkyd. To the reaction vessel of Example I is added 1391 parts of Emersol 315 fatty acid, 885 parts of benzoic acid, 746 parts of isophthalic acid and 850 parts of pentaerythritol. After heating the mixture to about 250° F., 3.8 parts of Fascat 4201 brand catalyst are added with additional heating, and 80 parts of xylene are added to maintain an azeotrope, the temperature rising to about 460° F. The reaction continues to an acid value of about 5–7 and a viscosity of about X–Y on the Gardner scale with a sample cut to about 70% solids with xylene. The resin is cooled, and once the temperature has fallen below about 300° F., 1400 parts of the propyl ether of propylene glycol are added.

EXAMPLE IV

The following example illustrates the reaction of the base alkyd prepared in Example I with ethylenically unsaturated monomers including an amine functional monomer. The following reaction portions were prepared:

| Portion I | |
|---|---|
| Propyl ether of propylene glycol | 604 parts |
| Portion II | |
| Methyl methacrylate | 555 parts |
| Styrene | 200 parts |
| Dimethylaminoethyl methacrylate | 245 parts |
| Vazo 67 brand polymerization initiator (azo-bis-2-methyl butyronitile, DuPont) | 32.2 parts |
| Alkyd prepared in Example I | 1875 parts |
| Portion III | |
| Propyl ether of propylene glycol | 40 parts |
| Portion IV | |
| Dicumyl peroxide catalyst (DiCup R brand, Hercules Chemical) | 30 parts |
| Propyl ether of propylene glycol | 100 parts |

Portion I is charged into a reactor equipped as described in Example I, and is heated to about 200° F. under an inert atmosphere. Portion II is added incrementally (10% initially) over the next 2 hours and 55 minutes, the temperature remaining at about 200° F. Portion III is then added and the batch is held for an additional hour at 200° F. One-half of Portion IV is then added and the temperature is raised to about 280° F. over a period of 30 minutes. After an hour at this temperature, the remainder of Portion IV is added, and the temperature is maintained at 280° F. for 2 hours before cooling.

EXAMPLE V

This example illustrates the reaction of the carboxyl-terminated butadiene/acrylonitrile copolymer-modified base alkyd (as prepared in Example II) with ethylenically unsaturated monomers including an amine functional monomer in the manner set out in Example IV. The procedure of Example IV was followed, except that Portion III was eliminated. The following portions were employed:

| Portion I | |
|---|---|
| Propyl ether of propylene glycol | 234 parts |
| Portion II | |
| Methyl methacrylate | 277.5 parts |
| Styrene | 100 parts |
| Dimethylaminoethyl methacrylate | 122.5 parts |
| Vazo 67 Brand polymerization initiator | 16.1 parts |
| CTBN-modified alkyd prepared in Example II | 1000 parts |
| Portion IV | |
| Dicumyl peroxide initiator | 15 parts |
| Propyl ether of propylene glycol | 50 parts |

EXAMPLE VI

This example illustrates the preparation of a monomer having two different ethylenically unsaturated groups, one derived from glycidyl methacrylate and the other derived from a fatty acid. To a reaction vessel equipped with stirrer, thermometer, nitrogen inlet and condensor was added 300 parts of glycidyl methacrylate, 590 parts of Emersol 315 brand fatty acid, 1.15 parts of the methyl ether of hydroquinone, and 1.5 parts of the catalyst tetrabutylammonium chloride. The ingredients are slowly heated over a period of about 1 hour to 150° C., and are held for two hours before cooling.

EXAMPLE VII

This example illustrates the reaction of a base alkyd, typified as that of Example I, with ethylenically unsaturated monomers of which at least one is an amine-functional monomer and another is the monomer prepared in Example VI. The procedure of Example IV is repeated exactly, except that the portions used are as follows:

| Portion I | |
|---|---|
| Propyl ether of propylene glycol | 297 parts |
| Portion II | |
| Methyl methacrylate | 77.5 parts |
| Styrene | 100 parts |
| Dimethylaminoethyl methacrylate | 122.5 parts |
| Vazo 67 polymerization initiator | 16.1 parts |
| Alkyd prepared by Example I | 943 parts |
| Monomer prepared in Example VI | 200 parts |
| Portion III | |
| Propyl ether of propylene glycol | 20 parts |
| Portion IV | |
| Dicumyl peroxide initiator | 15 parts |
| Propyl ether of propylene glycol | 50 parts |

EXAMPLE VIII

This example illustrates the preparation of the reaction product of a polyisocyanate with an acrylate derivative, the reaction product contributing to chip resistance of the resulting coating product. To a reactor equipped with a thermometer, agitator, nitrogen inlet and reflux condensor is added 482 parts of the caprolactone adduct of hydroxy ethyl acrylate (Tone M-100, a product of Union Carbide), 100 parts of toluene, and 0.1 parts of dimethyl tin dilaurate (UL-28, a product of Witco Chemical). The reaction mixture is heated to about 65° C. under an inert atmosphere, following which there is added to the reaction vessel over a 2-3 hour period at 65°-70° C. with agitation a mixture of 79 parts of toluene and 234 parts of Desmodur L-2291 (Mobay Corp.), a biuret of 1,6-hexamethylene diisocyanate. The reaction mixture is held at about 70° C. until no isocyanate peak is detected by infrared spectroscopy. The reaction mixture is cooled, and is found to have a viscosity of U-V on the Gardner scale (at 80% solids).

EXAMPLE IX

This example illustrates the preparation of a pigmented dispersion prepared from the grind vehicle of Example III. To a conventional Cowles mixer is added 404 parts of the alkyd of Example III, 116.8 parts of phthalo green and 4 parts of carbon black, the mixer being run at high speed for 15-30 minutes to thoroughly mix the ingredients. To the resulting mixture is added, in order with mixing intervals between additions, 290 parts of 2-ethyl hexyl alcohol, 494 parts of medium chrome yellow and 111.4 parts of titanium dioxide (rutile). The mixture is mixed until uniform and then is passed through a conventional sand mill and milled to a 7+ Hegman particle size (less than about 12.5 microns).

EXAMPLE X

This example illustrates the preparation of a coating composition which does not incorporate the chip-resistant features of the invention. This example is included as a "control" against which the chip resistance of coatings of the invention may be compared.

| Portion I |
|---|

-continued

| | |
|---|---|
| Alkyd from Example IV | 378.6 parts |
| Pigment dispersion from Example IX | 61.6 parts |
| 2-ethyl hexyl alcohol | 12.1 parts |
| Propionic acid | 10.3 parts |
| Portion II | |
| Manganese drier (Manganese hydro-cure, Mooney Chemicals, Inc.) | 5.4 parts |
| Drier promoter (a 1,10-phenanthroline product available from Vanderbilt Chemical Co. under the trademark ACTIV 8) | 0.67 parts |
| Ortho-t-butyl phenol | 1.07 parts |
| Portion III | |
| Deionized water | 2530.26 parts |

The ingredients of Portion I are mixed in order in a mixing vessel until uniform. Portion II is added in order, and mixed until uniform, following which Portion III is slowly added. The resulting coating composition has a solids content of 10%, a pH of about 4.9, and a conductivity of 700–800 microsiemens ("ms/cm"). A steel panel (Parker Chemical Company, Brand EP 10, P60) was coated for 2 minutes via electrodeposition with the composition at 75° F. at 100–120 volts. The panel was then rinsed with deionized water and force dried for 30 minutes at 250° F. A 1-mil film resulted. Gloss readings were taken with a Hunter D48D gloss meter, and values of 90+/80+ at 60 degrees and 20 degrees, respectively, were recorded. The coated panel was subjected to the chip test described above, and the results are reported in Example XIV. FIG. 1 is a photograph of a portion of the panel, showing substantial damage from chipping.

EXAMPLE XI

This example illustrates the preparation of a coating composition similar to that of Example X but utilizing the alkyd resin that chemically incorporates the carboxyl-terminated butadiene/acrylonitrile copolymer as an agent to improve chip resistance, the alkyd being the product of Example V.

The following portions were employed:

| | |
|---|---|
| Portion I | |
| Acrylated alkyd of Example V | 375 parts |
| Pigment dispersion from Example IX | 61.6 parts |
| 2-ethyl hexyl alcohol | 17.0 parts |
| Propionic acid | 10.3 parts |
| Portion II | |
| Manganese drier, 5% | 5.4 parts |
| Activ 8 brand drier promoter | 0.67 parts |
| Ortho-t-butyl phenol | 1.07 parts |
| Portion III | |
| Deionized water | 2528.96 parts |

The ingredients of Portion I were mixed in order in a mixing vessel until uniform. The ingredients of Portion II were then added in order and mixed until uniform. Portion III is slowly added, with mixing, resulting in a coating composition having a solids content of 10%, a pH of 4.9 and a conductivity of 700–800 ms/cm. Panels were coated via electrodeposition as in Example X, and the resulting 1.0 mil thick film exhibited gloss readings of 90+/80+ at 60 degrees and 20 degrees, respectively. Resistance to chipping was measured and is reported in Example XIV. A photograph of a portion of the resulting panel (FIG. 2) showed little damage.

EXAMPLE XII

This example illustrates a coating composition in which the resistance to chipping is improved by the inclusion, in the final coating composition, of an addition polymerizable oligomer, the alkyd being formed to include a preformed elastomer having functional groups and which is incorporated in the base alkyd during its preparation, the elastomer being exemplified as the carboxyl-terminated butadiene/acrylonitrile copolymer used in manufacturing the alkyd of Example II and utilized in Example V.

| | |
|---|---|
| Portion I | |
| Acrylated alkyd of Example V | 350 parts |
| Sartomer C-2000 acrylate oligomer | 27 parts |
| Pigment dispersion from Example IX | 61.6 parts |
| 2-ethyl hexyl alcohol | 5.0 parts |
| Propionic acid | 9.1 parts |
| Portion II | |
| Identical to that of Example XI | 7.14 parts |
| Portion III | |
| Deionized water | 2540.16 parts |

The ingredients of Portion I were mixed in order in a mixing vessel until uniform. The ingredients of Portion II were then added in order and mixed until uniform. Portion III was slowly added, with mixing. The resultant coating composition exhibited a solids content of 10%, a pH of 4.9 and a conductivity of 700–800 ms/cm. Panels were coated via electrodeposition as in Example X, and the 1.0 mil film which resulted exhibited gloss readings of 90+/80+ at 60 degrees and 20 degrees, respectively. Resistance to chipping was measured and is reported in Example XIV, FIG. 3 being a photograph of the panel.

EXAMPLE XIII

This example illustrates a coating composition similar to that of Example XI, except that the alkyd resin was derived from Example VII, having chemically incorporated in it a monomer having primary and secondary ethylenic unsaturation and prepared as in Example VI. The following portions were used:

| | |
|---|---|
| Portion I | |
| Acrylated alkyd from Example VII | 378.6 parts |
| Pigment dispersion from Example IX | 61.6 parts |
| 2-ethyl hexyl alcohol | 12.1 parts |
| Propionic acid | 10.3 parts |
| Portion II | |
| Manganese drier, 5% | 5.4 parts |
| Activ 8 brand drier promoter | 0.67 parts |
| Ortho-t-butyl phenol | 1.07 parts |
| Portion III | |
| Deionized water | 2530.26 parts |

The ingredients of Portion I were mixed together in a blender until uniform, and the ingredients of Portion II were then added in order and mixed until uniform. Portion III was then slowly added, with mixing, to provide a coating composition with a solids content of 10%, a pH of 4.9, and a conductivity of 700–800 ms/cm. The coating is electrically deposited upon a steel panel in a manner identical to that described in Example X, resulting in a 1-mil film. Gloss readings of 90+/80+ at 60 degrees and 20 degrees, respectively, were measured. Resistance to chipping was tested as described above and the results are reported in Example XIV.

EXAMPLE XIV

Several coated panels resulting from each of Examples X, XI, XII and XIII were subjected to the testing procedure described above to determine the resistance of the coatings to chipping. The coatings were rated by number with 0 showing the poorest chip resistance and 9 showing the best chip resistance. The following results were obtained:

| Example | Chip Resistance Rating |
|---|---|
| X (control) | 3 |
| XI | 6 |
| XII | 7 |
| XIII | 7 |

While preferred embodiments of the present invention have been described, it should be understood that various changes, adaptations and modifications may be made therein without departing from the spirit of the invention and the scope of the appended claims.

What is claimed is:

1. A cationic electrodeposition coating composition comprising, in aqueous dispersion, an alkyd derived from the reaction of a polyol with at least one unsaturated fatty acid and reacted with addition-polymerizable ethylenically unsaturated monomers including an amine functional unsaturated monomer in a quantity sufficient to render the coating composition water dispersible and cationically electrodepositable; the resulting modified alkyd having chemically incorporated in it one or more chemical agents in sufficient quantity to significantly increase the resistance to chipping of coatings made therefrom, said agents being selected from the group consisting of:
   (a) a pre-formed elastomer having one or more functional groups reacted with carboxyl or hydroxyl groups of the respective acid and polyol precursors of the alkyd resin, and
   (b) an addition polymerizable monomer having primary and secondary ethylenic unsaturation.

2. The coating composition of claim 1 wherein said pre-formed elastomer is derived from the polymerization or copolymerization of butadiene.

3. The coating composition of claim 1 wherein the pre-formed elastomer is a copolymer of butadiene and acrylonitrile.

4. The coating composition of claim 1 wherein the functional groups of the pre formed elastomer are carboxyl groups, hydroxyl groups or amine groups, the elastomer having an average of about 1.8 to about 2.2 functional groups per molecule.

5. A cationic electrodeposition coating composition comprising, in aqueous dispersion, an alkyd derived from the reaction of a polyol with at least one unsaturated fatty acid and reacted with addition polymerizable, ethylenically unsaturated monomers including an amine-functional unsaturated monomer in a quantity sufficient to render the coating composition water-dispersible and cationically electrodepositable, the alkyd incorporating a pre-formed, butadiene-derived elastomer which is generally linear and which includes an average of from about 1.8 to about 2.2 functional groups per molecule, said functional groups being carboxyl groups, hydroxyl groups or amine groups, said functional groups being reacted with carboxyl groups or hydroxyl groups of the respective acid and polyol precursors of said alkyd so that the pre-formed elastomer is chemically incorporated in the alkyd, the elastomer being present in sufficient quantity as to significantly improve the resistance to chipping of coatings made from the coating composition.

6. The coating composition of claim 5 in which the butadiene-derived elastomer is a copolymer of butadiene and acrylonitrile having a molecular weight in the range of from about 1,000 to about 100,000.

7. The composition of claim 5 wherein the pre-formed elastomer is chemically incorporated in the alkyd during formation of the latter from its fatty acid and polyol precursors.

8. A cationic electrodeposition coating composition comprising, in aqueous dispersion, a base alkyd derived from the reaction of a polyol with at least one unsaturated fatty acid, the alkyd being reacted with addition-polymerizable, ethylenically unsaturated monomers including an amine-functional unsaturated monomer in sufficient quantity to render the coating composition water dispersible and cationically electrodepositable and including at least one monomer having primary and secondary ethylenic unsaturation and having a molecular weight of at least 200, the latter monomer being incorporated in sufficient quantity as to significantly improve the resistance to chipping of a cured, electrodeposited coating of the composition.

9. The coating composition of claim 8 in which the monomer containing primary and secondary ethylenic unsaturation is the reaction product of a first compound having a primary unsaturated group and a second compound having a secondary unsaturated group.

10. The composition of claim 8 wherein the monomer containing both primary and secondary ethylenically unsaturated groups is derived from the reaction of a functional (meth)acrylate or an allyl alcohol or its derivatives, with an unsaturated acid or its derivatives.

11. The composition of claim 10 wherein the unsaturated acid is an unsaturated fatty acid.

12. The composition of claim 10 wherein said unsaturated acid is crotonic, itaconic or sorbic acid.

13. The coating composition of claim 11 in which the fatty acid has a molecular weight in the range of about 150–350 and an average of about 1–3 unsaturated groups per molecule.

14. The composition of claim 8 in which the monomer having primary and secondary ethylenically unsaturated groups is derived from the reaction of glycidyl methacrylate with a fatty acid.

* * * * *